United States Patent [19]

Carcich et al.

[11] Patent Number: 5,379,549
[45] Date of Patent: Jan. 10, 1995

[54] RECEPTACLE FOR SHIPPING HORTICULTURAL PRODUCTS

[75] Inventors: John Carcich, Newark, Calif.; William J. Lowry, Grand Rapids, Ohio

[73] Assignee: Aquila Enterprises, Holland, Ohio

[21] Appl. No.: 950,955

[22] Filed: Sep. 25, 1992

[51] Int. Cl.⁶ .............................................. A01G 9/02
[52] U.S. Cl. .................................... 47/84; 47/66; 206/423; 220/403
[58] Field of Search ............... 206/423; 220/403, 410; 47/84, 84 C, 66 C

[56] References Cited

U.S. PATENT DOCUMENTS

| | | | |
|---|---|---|---|
| 1,270,554 | 6/1918 | Rubel . | |
| 1,493,152 | 5/1924 | Cardner | 206/423 |
| 1,606,523 | 11/1926 | Gardner . | |
| 1,669,617 | 5/1928 | Kennedy . | |
| 2,774,187 | 12/1956 | Smithers | 47/84 |
| 2,814,910 | 12/1957 | Reparon | 47/84 C |
| 3,021,046 | 2/1962 | Pullen | 229/39 |
| 3,127,011 | 3/1964 | Weddle | 206/45.34 |
| 3,342,329 | 9/1967 | Knight | 206/65 |
| 3,552,059 | 1/1971 | Moore . | |
| 3,973,356 | 8/1976 | Schacht | 47/41 R |
| 4,071,064 | 1/1978 | Saul | 150/48 |
| 4,075,786 | 2/1978 | van Zyl | 47/84 |
| 4,170,301 | 10/1979 | Jones | 206/423 |
| 4,330,059 | 5/1982 | Freeman | 206/423 |
| 4,662,107 | 5/1987 | Van Den Kieboom | 47/84 |
| 4,936,046 | 6/1990 | Miller | 47/41.01 |
| 4,941,572 | 7/1990 | Harris | 206/423 |
| 5,038,930 | 8/1991 | Holtkamy | 206/423 |
| 5,115,915 | 5/1992 | Harris | 206/524 |

FOREIGN PATENT DOCUMENTS

| | | | |
|---|---|---|---|
| 8203460 | 9/1982 | Netherlands | 47/84 |
| 231167 | 5/1944 | Switzerland | 206/423 |

*Primary Examiner*—Henry E. Raduazo
*Attorney, Agent, or Firm*—Todd E. Marlette

[57] ABSTRACT

This receptacle for shipping horticultural products comprises an exterior box having an upper, lower, back and sidewall panels forming a rectangular shaped box having an open front; an open top vase including a moisture retention block is disposed within the lower portion of the vase; the moisture retention block is encompassed by a moisture barrier for maintaining the proper humidity for the floral arrangement; the moisture barrier including an open end that is closed by a retaining means; the exterior box receiving the vase therein and including means for holding the vase and the horticultural products in a stable condition during shipping, and at least one front panel and means for securing at least one front panel to the exterior box.

4 Claims, 2 Drawing Sheets

RECEPTACLE FOR SHIPPING HORTICULTURAL PRODUCTS

BACKGROUND OF THE INVENTION

The present invention pertains to a receptacle for shipping horticultural products, and more particularly to a receptacle for shipping a floral arrangement.

In the shipment of floral arrangements, it has been necessary to provide adequate protection for the flowers and a means for protecting the floral arrangement the right amount of moisture. The conventional type receptacles have provided for these purposes but still possess certain disadvantages. The conventional type receptacles do not make up an adequate shipping receptacle that is simple and inexpensive to manufacture while maximizing the use of the area within the receptacle.

One such receptacle is U.S. Pat. No. 4,936,046 to Miller that discloses a receptacle for the transport, storage and display of horticultural articles which includes a base, inner receptacle, an insert element, a side element, and a cover element. The elements are slidably connected to form the receptacle without any connecting measures. This conventional art requires a plurality of pieces that require separation every time the vase containing the flowers is to be assembled or removed. This structure requires a considerable expense of manufacture and is labor intensive.

SUMMARY OF THE INVENTION

This receptacle provides a means for storage and transport of a floral arrangement and other horticultural products under rough conditions, for hours of duration, and without damage to the interior products. Additionally, manufacture and assembly of the receptacle is non labor intensive and cost effective.

This receptacle for shipping horticultural products comprises an exterior box having an upper, lower, back and sidewall panels forming a rectangular shaped box having an open front; an open top vase including a moisture retention block is disposed within the lower portion of the vase; the moisture retention block is encompassed by a moisture barrier for maintaining the proper humidity for the floral arrangement; the moisture barrier including an open end that is closed by a retaining means; the exterior box receiving the vase therein and including means for holding the vase and the horticultural products in a stable condition during shipping, and at least one front panel and means for securing at least one front panel to the exterior box.

In one embodiment of this invention the horticultural products are an arrangement of fresh flowers having cut stems, the moisture retention block is a foam block or other type of moisture retention block adapted to receive the stems of the flowers therein.

It is an object of the present invention to provide a novel receptacle that overcomes the disadvantages of the conventional art and is simple and inexpensive to manufacture and effective for delivering flowers or other horticultural products.

Another object of this invention is to provide a moisture barrier encompassing the moisture retention block and extending up and over the floral arrangement. The moisture barrier is sealed at the open end by a tie string or the like and could include a plurality of holes located in proximity of the sealed end for allowing the proper humidity to be maintained.

It is an object of this invention to hold the vase in a stable position during shipping that employs a simple and inexpensive means to accomplish such. The vase is held by employing an interior liner or using a plurality of cleats.

It is still another object of this invention to provide at least one product box for storing a gift requested by a customer. The invention provides for at least one product box to be located in proximity to the upper panel of the exterior box.

It is an object of this invention to provide an exterior box made of corrugated design having the flutes running in one direction and the means for holding the vase in a stable condition during shipping also of a corrugated design but with the flutes running at a perpendicular angle to the exterior box.

It is still another object of this invention to allow a customer of the floral arrangement to hand write a short message and then have the handwritten message or other type of message transmitted by facsimile or an equivalent mode of transmission to the person assembling the floral arrangement. The transmitted message is mailed along with the floral arrangement to the recipient.

These and other objects arid advantages will become apparent from the following description of a preferred embodiment of the invention taken together with the accompanying drawings.

BRIEF DESCRIPTION OF THE DRAWINGS

The invention may take form of various arrangements. The drawings are only for purposes of illustrating a preferred embodiment and are not to be construed as limiting the invention.

DESCRIPTION OF THE PREFERRED EMBODIMENT

Figure 1:
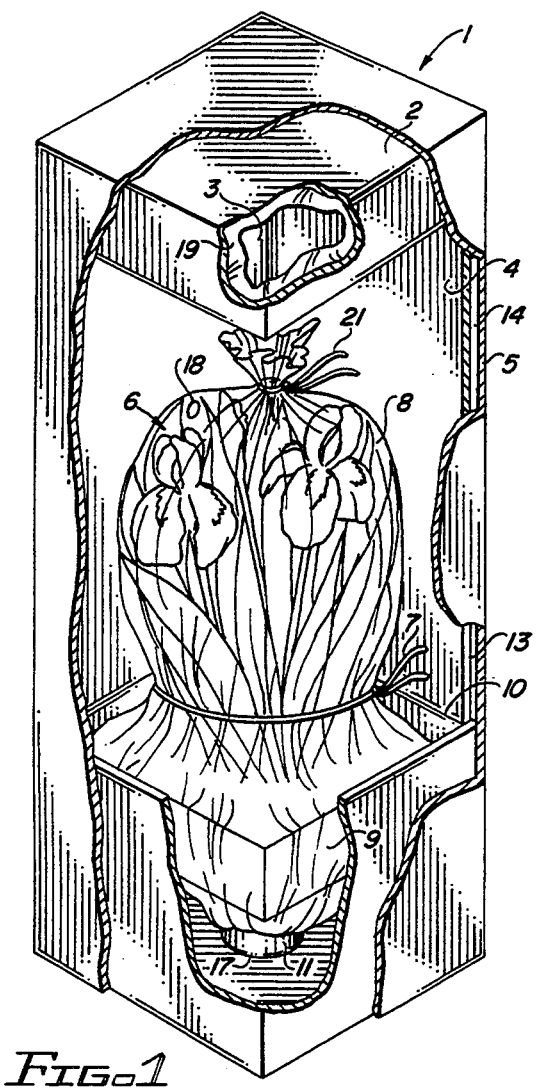
FIG. 1 is a perspective view of the shipping receptacle for a floral arrangement or other horticultural products of the present invention.

FIG. 1 shows receptacle 1 for shipping horticultural products according to the preferred embodiment of this invention. The receptacle 1 is designed for the storage, transport and then display of a floral arrangement. The receptacle 1 is constructed from a corrugated type board and includes exterior receptacle 5, an air space 14, an open top vase 10, an interior liner 4 and optionally a product box 2. Receptacle 1 may be opened at the top to retrieve a gift 3 or opened at the bottom to retrieve the floral arrangement 6.

The exterior receptacle 5 includes upper, lower, back and sidewall panels forming a rectangular shaped box having an open front. Exterior receptacle 5 according to the preferred embodiment is a box. The exterior receptacle 5 provides protection to the horticulture product from abrasions and the elements such as heat, cold, and rain. An air space 14 is provided on the inside walls of the exterior receptacle 5 and also acts as an insulator for protecting the floral arrangement or other horticultural products from heat and/or cold during shipping.

The open top vase 10 fits slidably into the bottom of the receptacle and is preferably made from a non-moisture resistant material such as board stock or fiberboard stock. Although a material such as ceramic glass may be used, such materials are relatively expensive and are easily susceptible to damage. A material such as board stock is not easily cracked and is very cost effective. It should be noted that moisture barrier 8 prevents water damage to vase 10 from moisture retention block 9 through its placement there-between. The vase could include high quality graphics on its exterior to give a pleasing appearance.

The open top vase 10 houses a moisture retention block 9 made of oasis, foam, moss or the like and has an end adapted for receiving the floral arrangement or other horticultural products therein. In the embodiment of FIG. 1, a moisture barrier 8 encompasses the moisture retention block 9 and extends up and over the floral arrangement 6 fully encompassing such. The moisture barrier 8 is a plastic bag. However, it could be metallic foil, impregnated craft paper or an equivalent film. It is preferable that the end of the moisture barrier 8 be closed with an upper retaining means 21 which may be a tie string as well as a type of seal such as ultrasonic, heat heal, or glue.

A lower retaining means 7 is used in the preferred embodiment to hold floral arrangement 6 and moisture retention block 9 in place. The members of the floral arrangement are tied together to provide mutual support. While not required for the present invention, ends of lower retaining means 7 may be affixed to exterior receptacle 5 to provide additional support. Additionally, lower retaining means is used to shape the moisture barrier 8 to the floral arrangement. Lower retaining means 7 is preferably made of string but may also be a strip of adhesive.

The moisture barrier 8 may include a hole or holes represented by hole 18 located in proximity to the open end of the moisture barrier 8 for controlling the humidity within the floral arrangement 6. Moisture barrier 8 is also used to protect a non-moisture resistant vase from moisture emitted from moisture retention block 9. It should be understood that the number and size of any holes are optimized for a general use or may be specifically tailored for rare and exotic plants. Additionally, the moisture barrier 8 may be made of a gas permeable membrane which would allow vaporized water (measured as humidity) to diffuse through. In this case, no solid or liquid permeable holes would be present. Moreover, some rare and tropical foliage may require a moisture barrier 8 which has no holes, thus providing a humid environment. Moisture barrier 8, through helping to retain moisture, provides protection to the horticulture product from elemental extremities.

Moisture barrier 8 surrounds the moisture retention block 9. The moisture barrier 8 is secured to the open top vase 10 by an adhesive 11 at adhesive point 17. The adhesive 11 can be glue, temperature reactive adhesive, pressure reactive adhesive, double sided tape, a staple or another type of securing means. The moisture retention block 9 is made of foam. However, it could be made out of other materials such as oasis, Sahara foam, moss or other suitable material. Although not shown, moisture retention block 9 may be glued to moisture barrier 8 to provide additional support during transport.

The interior liner 4 is used to wrap the floral arrangement 6. The interior liner 4 is preferably made using one piece of board stock having three folds. The interior liner 4 helps to form the air space 14 and also provides elemental protection. Moisture within the receptacle 1 which is exterior to the moisture barrier 8 is trapped by interior liner 4.

Figure 2:
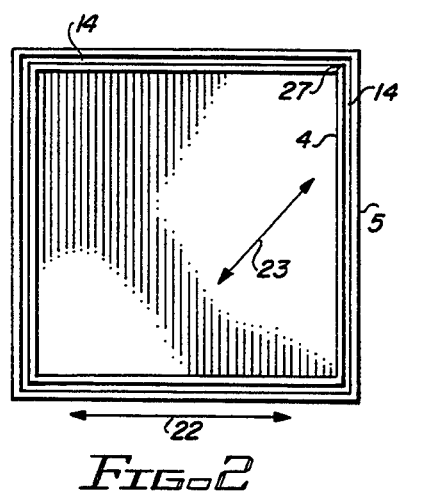
FIG. 2 is a partial sectional view showing the interfitting relationship of the receptacle of FIG. 1.

The two ends of interior liner 4 are joined together at wall joint 27 as shown in FIG. 2. Referring back to FIG. 1, interior liner 4 wraps floral arrangement 6 before the open top vase 10 is inserted into the receptacle 1. Thus, the floral arrangement 6 is inserted into the exterior receptacle 5 with the interior liner 4 protecting the floral arrangement 6. The exterior of receptacle 5 can contain high quality graphics to give a pleasant appearance. The interior liner 4 is also used to retain the open top vase 10 in position. A bottom edge of interior liner 4 contacts a top edge of open top vase 10 at contact point 13. This prevents the open top vase 10 from sliding within the receptacle 1.

As shown in the embodiment of FIG. 1, the receptacle 1 includes a product box 2 in the upper panel of the exterior receptacle 5 for shipping a gift 3 along with the floral arrangement 6. It should be noted that the invention as described may be used without the product box 2. The product box 2, when used, is securely held to exterior receptacle 5 by support from interior liner 4 and the exterior receptacle itself. The gift 3 may be a box of candy, a bottle of wine or any other suitable gift. The gift 3 is wrapped by a film barrier 19 which is made out of plastic. However, this barrier could also be made from metallic film or the like before being placed around the product box 2. This helps to protect the gift 3 from deterioration from the humidity required by the floral arrangement. A second product box could additionally be inserted on top of product box 2 by shortening the length of interior liner 4.

Turning to FIG. 2, it will be seen that the exterior receptacle 5 is made of corrugated board or an equivalent design having unidirectional flutes as illustrated by 22. The interior liner 4 is also of a fluted type construction where the perpendicular flutes run at a perpendicular angle to the exterior receptacle 5 as illustrated by 23. By allowing for the box construction of the receptacle 1 to have corrugates running in different directions, optimum strength can be maintained in all directions and thus provide a receptacle 1 that is difficult to collapse. Wall joint 27 joins two surfaces on the different ends of the interior liner 4.

Figure 3:
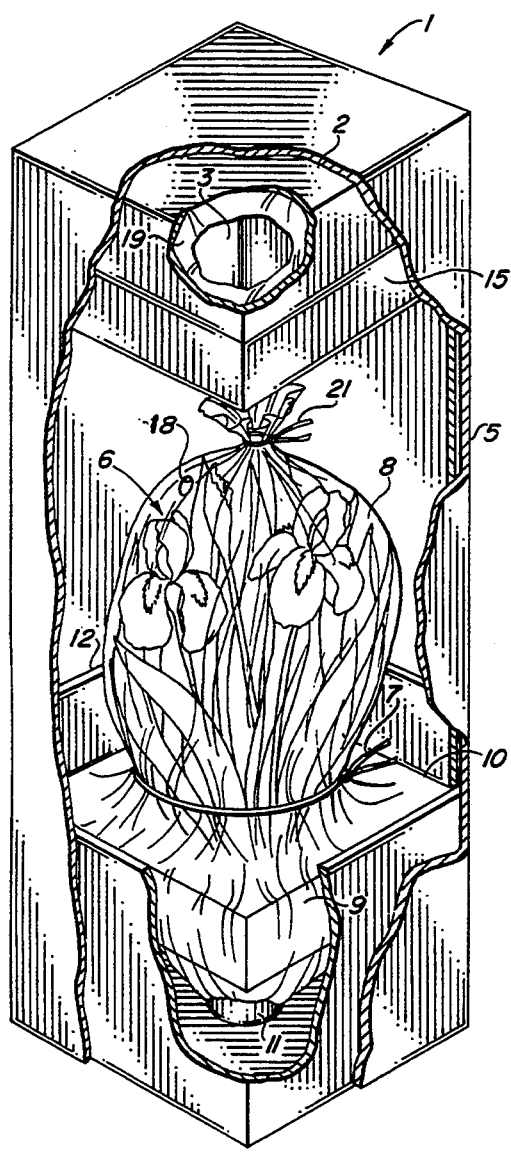
FIG. 3 is an alternate embodiment of the shipping receptacle showing the use of cleats to hold the vase and product box in place.

FIG. 3 illustrates an alternate embodiment of the invention in which cleats 12 are employed for preventing the open top vase 10 from sliding within the exterior receptacle 5. The cleats 12 are glued, stapled or otherwise fastened to the interior wall of the exterior receptacle 5 and are used in pairs opposite one another. It is preferably that the pairs of cleats 12 are made of the same material as the exterior receptacle 5 but other materials may be used.

Additional cleats 15 are employed in like manner to secure the product box 2. It is to be realized that another pair of cleats may be employed to secure an additional product box within an open area of exterior receptacle 5. Although not necessary for the present invention, the additional cleats 15 may be used to secure a separator piece of board stock to separate the product box 2 form floral arrangement 6.

Figure 4:
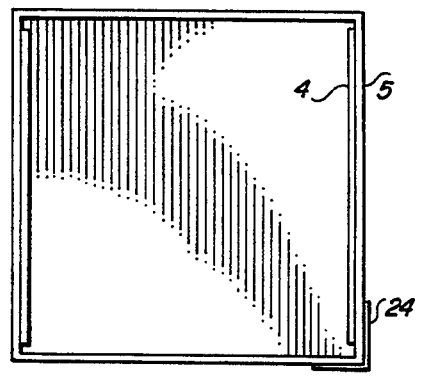
FIG. 4 illustrates a perspective view of sealing the exterior box.
Figure 5:
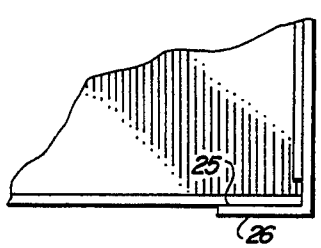
FIG. 5 illustrates an embodiment for sealing the sides of the exterior box.

FIG. 4 is a view showing the exterior receptacle 5 being sealed with a piece of tape 24 and FIG. 5 shows the exterior receptacle 5 being sealed with glue joint 25 including a flap 26.

Figure 6:
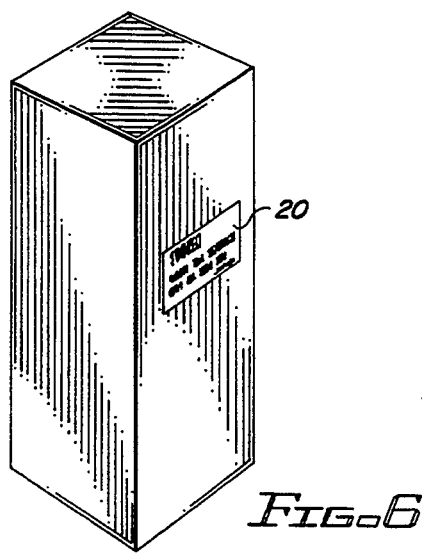
FIG. 6 is a perspective view showing a hand written note sent by facsimile to the person assembling the receptacle for inclusion with the floral arrangement.

FIG. 6 shows a facsimile of a handwritten note 20 which is included with the floral arrangement and gift before shipping the receptacle 1 to the recipient. The handwritten note is transmitted by U.S. mail, facsimile or an equivalent mode of transmission to the person assembling the floral arrangement and mailed with the floral arrangement to the recipient. This allows a customer to purchase flowers and a gift but send a handwritten personalized note with the order from another state many miles away from where the order is to be delivered.

Figure 7:
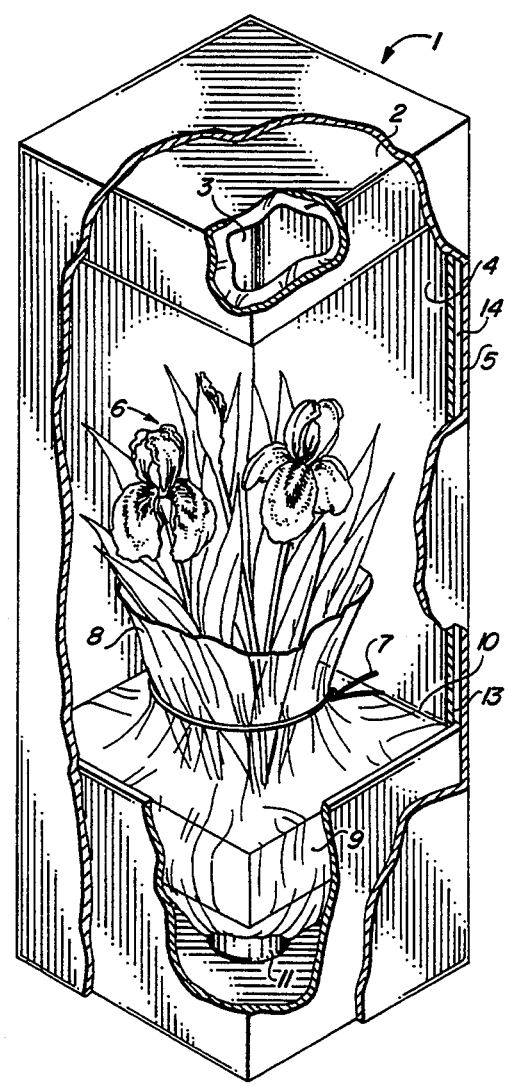
FIG. 7 is a perspective view of the shipping receptacle showing the moisture barrier extending an insubstantial degree above the rim of the vase.

FIG. 7 shows the shipping receptacle constructed with moisture barrier 8 extending partially over floral arrangement 6. In this embodiment, the moisture barrier is still used to protect a non-moisture resistant vase such as vase 10. This embodiment is preferable for horticulture products which do not require extensive humidity retention during transport.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. A receptacle for securely holding and protecting a horticulture product during shipment comprising:

an exterior receptacle having an exterior upright wall portion, a closable top opening, and a closable bottom opening, for providing a first degree of protection to the horticulture product from an external environment;

an interior liner having an interior upright wall portion and a lower edge, configured to be slidably received within the exterior receptacle for providing a second degree of protection to the horticulture product from the external environment;

an open top vase configured to be slidably received within the exterior receptacle and securely held through a contact with the lower edge of the interior liner for providing support to the horticulture product;

a moisture retention block configured to be slidably received within the open top vase for holding and providing moisture to the horticulture product; and a moisture barrier flexibly disposed between the open top vase and the moisture retention block for retaining moisture from the moisture retention block within the moisture barrier and for providing a third degree of protection to the horticulture product from the external environment.

2. The receptacle according to claim 1 wherein:

the interior liner and the exterior receptacle form an airspace there between to provide a fifth degree of protection to the horticulture product.

3. The receptacle according to claim 1 wherein:

the moisture barrier contains a hole for maintaining a humidity condition condition within the moisture barrier.

4. The receptacle according to claim 1 further comprising:

a means for affixing the moisture barrier to the open top vase to provide increased stability during transport.

* * * * *